United States Patent
Chin et al.

(10) Patent No.: US 6,199,118 B1
(45) Date of Patent: Mar. 6, 2001

(54) SYSTEM AND METHOD FOR ALIGNING AN INITIAL CACHE LINE OF DATA READ FROM AN INPUT/OUTPUT DEVICE BY A CENTRAL PROCESSING UNIT

(75) Inventors: Kenneth T. Chin, Cypress, TX (US); Clarence K. Coffee, Pembroke Pines, FL (US); Michael J. Collins, Tomball, TX (US); Jerome J. Johnson; Phillip M. Jones, both of Spring, TX (US); Robert A. Lester, Houston, TX (US); Gary J. Piccirillo, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/135,703

(22) Filed: Aug. 18, 1998

(51) Int. Cl.⁷ ........................................................ G06F 3/00
(52) U.S. Cl. .................................... 710/1; 710/4; 710/40; 710/129; 711/105; 711/146; 711/202; 345/501; 345/520; 712/22
(58) Field of Search ............................ 710/1, 4, 40, 129; 712/22, 218; 711/202, 105, 146; 345/501, 520

(56) References Cited

U.S. PATENT DOCUMENTS

| | | | |
|---|---|---|---|
| 5,307,469 | * | 4/1994 | Mann .......................................... 711/5 |
| 5,481,689 | * | 1/1996 | Stamm et al. ........................ 711/202 |
| 5,659,696 | * | 8/1997 | Amini et al. .......................... 395/412 |
| 5,710,906 | * | 1/1998 | Ghosh et al. ......................... 711/146 |
| 5,781,753 | * | 7/1998 | McFarland et al. .................. 712/218 |
| 5,867,724 | * | 2/1999 | McMahon ............................... 712/22 |
| 5,881,256 | * | 3/1999 | Lee ....................................... 710/129 |
| 5,890,196 | * | 3/1999 | Miller et al. .......................... 711/105 |
| 5,896,543 | * | 4/1999 | Garde ..................................... 712/35 |
| 5,936,640 | * | 8/1999 | Horan et al. .......................... 345/501 |
| 5,948,081 | * | 9/1999 | Foster ..................................... 710/40 |

* cited by examiner

Primary Examiner—Ayaz R. Sheikh
Assistant Examiner—Frantz B. Jean
(74) Attorney, Agent, or Firm—Kevin L. Daffer; Conley, Rose & Tayon (57) ABSTRACT

A computer is provided having a bus interface unit coupled between a CPU bus, a PCI bus and/or a graphics bus. The bus interface unit includes controllers linked to the respective busses and further includes a plurality of queues placed within address and data paths linking the various controllers. A processor controller coupled between a processor local bus determines if an address forwarded from the processor is the first address within a sequence of addresses used to select a set of quad words constituting a cache line. If the address (i.e., target address) is not the first address (initial address) in that sequence, then the target address is modified so that it becomes the initial address in that sequence. Quad words are received in sequential order and placed into the queue. When the quad words are sent to the CPU, they are in toggle order. This ensures the processor controller, and eventually the processor, will read quad words in toggle mode address order, even though the quad words are dispatched from the peripheral device in address-increasing (non-toggle mode) order.

18 Claims, 4 Drawing Sheets

SYSTEM AND METHOD FOR ALIGNING AN INITIAL CACHE LINE OF DATA READ FROM AN INPUT/OUTPUT DEVICE BY A CENTRAL PROCESSING UNIT

BACKGROUND OF THE INVENTION

1. Field of the Invention

This invention relates to a computer and, more particularly, to a bus interface unit which allows a central processing unit ("processor") to read burst of data from a device coupled to a peripheral bus and, more particularly, to read the data provided in sequential address order from the device into the processor in toggle mode order.

2. Description of the Related Art

Modern computers are called upon to execute instructions and transfer data at increasingly higher rates. Many computers employ CPUs which operate at clocking rates exceeding several hundred MHz, and further have multiple busses connected between the CPUs and numerous input/output devices. The busses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interface ("PCI") bus to which higher speed input/output devices can be connected.

Coupled between the various busses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

The north bridge, henceforth termed a bus interface unit, serves to link specific busses within the hierarchical bus architecture. Preferably, the bus interface unit couples data, address and control signals forwarded between the CPU local bus, the PCI bus and the memory bus. Accordingly, the bus interface unit may include various buffers and/or controllers situated at the interface of each bus linked by the interface unit. In addition, the bus interface unit may receive data from a dedicated graphics bus, and therefore may include an advanced graphics port ("AGP"). As a host device, the bus interface unit may be called upon to support both the PCI portion of the AGP (or graphics-dedicated transfers associated with PCI, henceforth is referred to as a graphics component interface, or "GCI"), as well as AGP extensions to the PCI protocol.

Mastership of the various busses is preferably orchestrated by an arbiter within the bus interface unit. For example, if the CPU (or processor) coupled to the local CPU bus wishes to read data from a peripheral device coupled to the peripheral bus, it must solicit mastership of the peripheral bus before doing so. Once mastership is granted, the processor can then read the appropriate data from the peripheral device (preferably an input/output device) to temporary storage devices or "queues" within the bus interface unit.

Typically, data is arranged within the peripheral device, system memory and/or cache locations within the processor according to cache lines. A read operation from a peripheral device to the processor assumes that at least a portion if not the entire cache line is involved in the read transaction. To transfer an entire cache line, several clock cycles may be needed. For example, a cache line may contain four quad words and each read cycle can transfer one quad word or eight bytes across a 64-bit memory bus.

A particular byte within the cache line can therefore be addressed by several bits. The least significant three bits can be used to determine a particular offset within each quad word, and the next two least significant bits are used to determine which quad word is being addressed within the cache line.

In many instances in which a processor requests data from a peripheral device, the first address dispatched to the peripheral device designates either the first, second, third or fourth quad word within a particular cache line. Thus, it is said that the initial address is not constrained to a cache line boundary. In fact, most modern processors extract quad words from a cache line based on a particular addressing mode known as the "toggle mode".

Toggle mode addressing of the cache line is generally known as a specific order by which data is read into the processor. Toggle mode addressing depends on which quad word is first addressed. The first-addressed quad word is often deemed the "target" quad word. Toggle mode addressing can be thought of as dividing a cache line in half, wherein the next successive quad word is dependent on where in the cache line the target quad word resides. For example, if a target quad word resides at hexadecimal address location 08 (or 01000 binary), then the target quad word will be read first, followed by quad word at address 00 to complete the ordering of the first half of the cache line being read. The second half of the cache line is read identical to the first half. That is, the quad word at hexadecimal address location 18 will be read before address location 10.

The mechanism of toggle mode addressing from an initial target address until the entire cache line is transferred is generally well known as a conventional microprocessor addressing scheme. Unfortunately, a peripheral device connected to the PCI bus or the dedicated graphics bus (e.g., AGP) wants to send and receive bursts of data in sequential addressing order (i.e., data residing at addresses having numerically increasing values). In particular, a peripheral device contains a cache line of data accessible by an initial address representing the smallest addressing value of that cache line. The target address may access a quad word somewhere within that cache line and not necessarily the same address as the initial address. To receive a burst of data from the peripheral device into the processor, it is advantageous to retrieve the data from the peripheral device in sequential addressing order. However, the sequentially increasing addresses are not recognizable to a processor requesting data in toggle mode order. Thus, the target address for the cache line to be read by the processor must somehow be modified so that a sequential order of addresses, beginning with the initial address, can be sent. The peripheral device could then more efficiently burst data at those address locations back toward the processor. The benefit in bursting data address in sequential order becomes apparent when dealing with the peripheral bus protocol.

Typical accesses to a peripheral device requires arbitration of the peripheral bus. Once mastership is gained, the processor can then address data residing within the peripheral device. Thereafter, the data can be returned to the processor. If the target address is not the initial address (i.e., lowest address in a numerically increasing sequence of addresses) of the cache line, then only the target data of one quad word can be transferred at a time. Extracting the next quad word within that cache line in toggle mode order requires the same sequence of steps used to transfer the target data. The cycles involving arbitration, address, data, and turn-around must therefore be repeated four times for the four quad words within each cache line. This would therefore involve at least sixteen peripheral bus cycles.

It would therefore be desirable to derive a bus interface unit which can modify the target address to that of an initial address used to access the first (lower most addressable) quad word within a sequence of quad words forming the cache line. By modifying the addressing seen by the peripheral device, the peripheral device can send data to the processor in burst fashion conducive to the peripheral device. That is, the peripheral device would like to dispatch data in sequential, increasing address order. If, somehow, the first quad word can be addressed as an initial quad word, then the remaining quad words in the cache line will naturally burst from the peripheral device without having to re-arbitrate for the peripheral bus or consume cycle time to effectuate turn-around.

SUMMARY OF THE INVENTION

Broadly speaking, the present invention contemplates a computer and/or a bus interface unit. The bus interface unit is configured as a north bridge between a CPU local bus, a PCI bus, a graphics bus, and a memory bus. The CPU bus can link at least one and possibly more processors and associated cache storage locations within those processors. Additionally, the memory bus links a memory controller within the bus interface unit to system memory denoted as semiconductor memory. Examples of suitable system memory include, for example, DRAM or synchronous DRAM (SDRAM). If the graphics bus is an AGP/PCI bus, then a link may exist to the bus interface unit by the AGP interface to effectuate, e.g., 66 MHz 1×AGP transfers or 133 MHz 2×AGP data transfers. The bus interface unit maintains a PCI interface which is synchronous to the CPU interface and supports PCI bursts cycles.

The bus interface unit is particularly suited to rearrange or modify a target address sent from a processor to a peripheral device coupled upon a peripheral bus. A processor controller within the bus interface unit is coupled between the CPU local bus and various queues also within the bus interface unit. The processor controller receives the target address from the processor and stores the address within a queue, also within the bus interface unit. The queue then de-queues the target address and places the address into a peripheral controller (i.e., an PCI, AGP or GCI interface) linked between the address queue and the peripheral bus which links the peripheral device. The peripheral controller modifies the address. Modifying the address not only changes the target address to another address (i.e., an "initial address") but also ensures the initial address is the first addressable location (lowest order address location) within the particular cache line selected within the peripheral device for reading by the processor. Accordingly, the peripheral controller contains logic which modifies those select bits. Assuming the cache line contains four quad words, the logic modifies the third, fourth and fifth least significant bits within the target address. Those bits are set to hexadecimal 00 so that the initial address will always be the lowest address within the cache line request.

Select address bits sent from the processor to the peripheral controller are sent to a buffer (henceforth referred to as the I/A2P queue), also within the bus interface unit. The address bits are used to select the order of quad words returned from the peripheral controller. More specifically, the address bits places the quad words sequentially returned from the peripheral controller into, according to one example, a data queue within the I/A2P queue in the toggle order that the processor expects. The quad words are de-queued from the data queue using, e.g., a multiplexer. Select pins to the multiplexer draws data from the data queue in the sequential order of location. Even though the quad words are dispatched from the peripheral controller in increasing address order, the data queue (via the way the queue is loaded) forwards that data in toggle mode to the processor controller. It is appreciated that re-ordering can be accomplish by various techniques beyond simply use of a redirection, and that, for example, re-ordering of data can occur prior to or after placing data into the data queue.

Merely as an example, if the target quad word is the third quad word within a cache line, the peripheral controller will modify the address (i.e., target address) from that which selects the target quad word to an address (i.e., initial address) which selects the initial quad word within a sequence of quad words within a cache line containing the target quad word. The peripheral controller thereby contains logic for modifying 10 hex (i.e., third quad word) to 00 hex or, for that matter, any address other than 00 hex to 00 hex. The peripheral controller therefore preferably contains combinatorial logic within the address path. The peripheral controller then forwards to the peripheral device the initial address of 00 hex. The peripheral device will then naturally burst the initial quad word, followed in sequential order with the remaining quad words in that cache line. The remaining quad words includes the target quad word.

It therefore becomes important to monitor the location of the target quad word relative to the first-arriving initial quad word. The I/A2P queue situated between the peripheral controller and the processor controller contains logic and/or a controller which extracts select bits within the address previously sent from the processor controller, and retains that address within the I/A2P queue. The address associated with a cache line is preferably aligned with data returned within that cache line. The logic and/or controller within the I/A2P queue then loads the data arriving into the data queue in the order set by the address dispatched from the processor. In the above example, the first arriving quad word (at 00 hex address) returned from the peripheral controller is placed in a third location of the data queue, commensurate with the third address sent from the processor controller. However, the third arriving quad word (at 10 hex address) returned from the peripheral controller is placed in a first location of the data queue, commensurate with the first address (target address) sent from the processor controller. Data is drawn from the data queue in sequential queue location order. Given the above example, the data word (target word) first addressed by the processor controller is de-queued from the data queue first, followed immediately or eventually by the initial word.

Thus, even though the processor sends addresses in toggle mode order, the peripheral controller modifies those addresses to a sequence recognizable by the peripheral device to allow data bursts from the peripheral device to the I/A2P queue. By modifying toggle mode addressing to a numerically increasing addressing mode, the peripheral device can burst an entire cache line without having to re-arbitrate for the peripheral bus. Accordingly, a cache line read from a peripheral device can occur in a minimum of nine cycles for a four quad-word burst rather than sixteen cycles.

Broadly speaking, the present invention contemplates a computer. The computer includes a peripheral device, such as one coupled to a peripheral bus, wherein the peripheral device is adapted to store a plurality of quad words arranged within a cache line. A processor is connected to a local bus, wherein a bus interface unit is coupled between the local bus and the peripheral bus. The processor can be operated to read a target quad word from the peripheral device during a read cycle of an initial read transaction. The target quad word may correspond to an address which is not the first (lowest) address of quad words within the cache line. For example, the target quad word may correspond to the second, third or fourth address within a successive order of addresses used to select a portion of the cache line.

The bus interface unit serves to fetch the plurality of quad words in successive address order from the peripheral device beginning with the lowest address and ending with the highest address of quad words within the cache line. More specifically, the bus interface unit draws quad words in successive address order due to the peripheral bus protocol accepting addresses in such an order needed to carry out bursts reads. Conversely, the processor selects quad words in toggle mode order. Therefore, incompatibility with the addressing order used on a processor and that used to select quad words in a peripheral bus sets forth the advantages of the present bus interface unit and the reordering of addresses to achieve a more efficient burst read from devices linked to the peripheral bus based on addresses dispatched from the processor. As such, the bus interface unit serves to address quad words within a peripheral device in sequential order, but returns quad words to the processor in toggle mode order According to another embodiment, the computer includes a bus interface unit coupled between the peripheral device and the processor. The bus interface unit includes a processor controller connected to the local bus for receiving a target address dispatched from the processor. The target address corresponds to one of a plurality of quad words arranged within a cache line. The peripheral controller includes logic for modifying the target address to an initial address having the smallest numerical address from among the plurality of quad words within the cache line. An I/A2P queue is coupled to receive the plurality of quad words selected by the numerically increasing addresses. A controller, or logic, within the I/A2P queue reorders the quad words as they enter or exit the data queue. According to one embodiment, the selection logic de-queues the data queue beginning with the target word corresponding to the target address. Accordingly, the selection logic de-queues in the same order in which the processor dispatches addresses to the processor controller. The data corresponding to addresses sent by the processor arrive back at the processor in the same order in which those addresses are dispatched. Accordingly, the processor can send addresses in toggle mode and receive data back in toggle mode. However, the peripheral device receives addresses in sequential (numerically increasing) address order and sends data back in the same sequential order. The bus interface unit takes care of re-ordering addresses and data so as to maintain the preferred toggle mode and sequential mode addressing schemes used by the processor and peripheral device, respectively.

The present invention further contemplates a method for reading quad words stored within a device linked to a peripheral bus. The method includes presenting a target address from a processor linked to a local bus. The target address is then re-ordered to an initial address within a sequence of numerically increasing addresses used to successively access the plurality of quad words within a single cache line. The plurality of quad words are then presented to a data queue beginning with an initial quad word addressed by the initial address. The data queue is then de-queued to the processor beginning with the target quad word addressed by the target address. Thereafter, de-queuing of the data queue occurs in the sequence in which addresses are presented from the processor. The initial quad word addressed by the initial address therefore is sent to the processor after the target quad word if the target quad word was the first quad word addressed by the processor.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
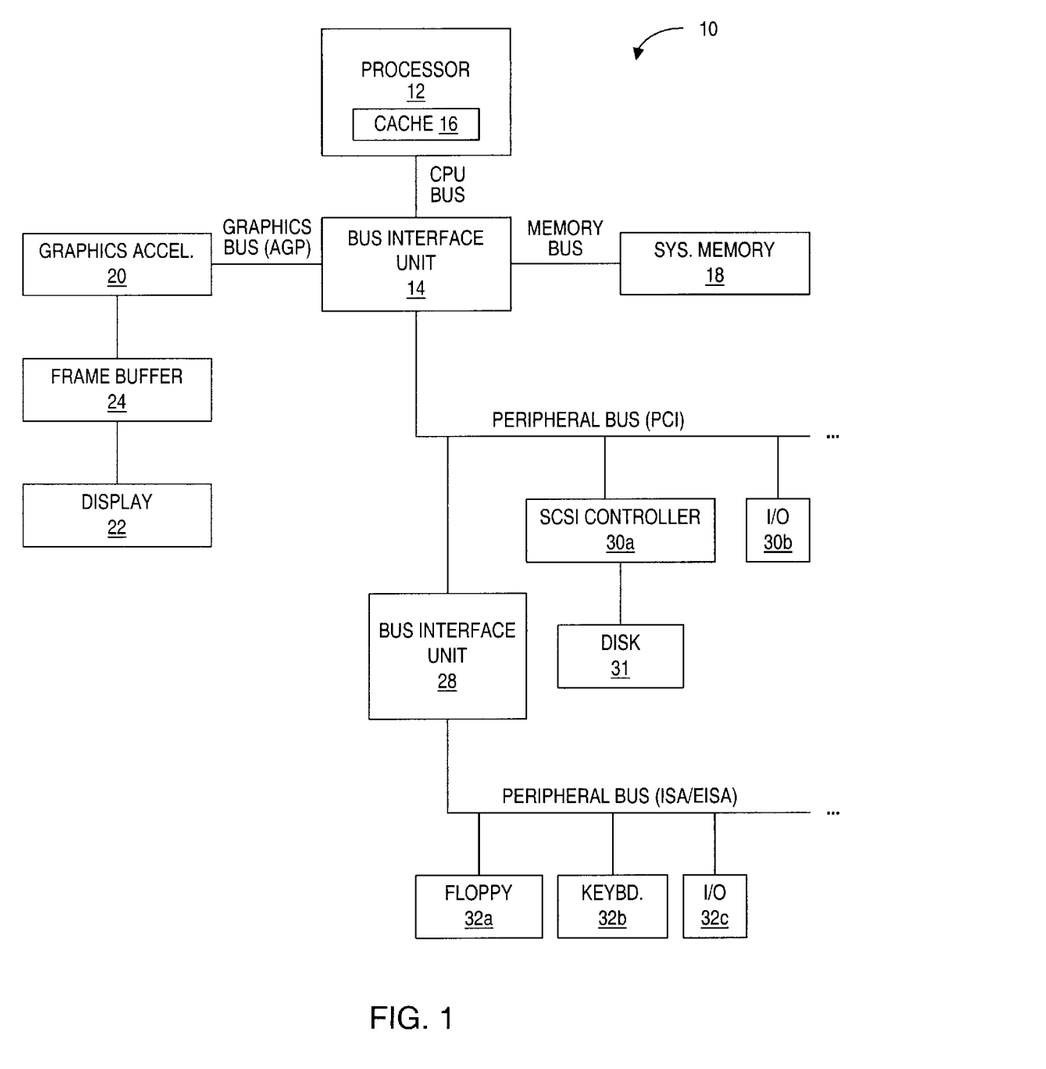
FIG. 1 is a block diagram of a computer system comprising various buses and bus interface units.

Turning now to the drawings, FIG. 1 illustrates a computer 10 having multiple busses, including a CPU bus, a mezzanine or PCI bus, and a peripheral bus or ISA/EISA bus. The CPU bus connects a CPU or processor 12 to a bus interface unit or north bridge 14. A cache memory 16 is preferably embodied within processor 12 and/or linked to processor 12 by the CPU bus. Bus interface unit 14 provides an interface between components clocked at similar rates. Bus interface unit 14 preferably contains a memory controller which allows communication to and from system memory 18. A suitable system memory 18 comprises DRAM or SDRAM. Interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is physically, logically, and electrically independent of the PCI bus and is intended for the exclusive use of a display device 22 coupled to the graphics port (AGP) by a graphics accelerator and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of video, defined as a still picture. Display 22 is any electronic display upon which an image or text can be presented. A suitable display 22 includes a cathode ray tube ("CRT") a liquid crystal display ("LCD"), etc.

Interface unit 14 is generally considered an application specific chip set or application specific integrated circuit ("ASIC") that provides connectivity to various busses, and integrates other system functions such as memory interface and P1394. Systems memory 18 is considered the main memory and refers to a portion of the addressable memory that the majority of memory accesses target. System memory is accessed via interface unit 14, and is considered the largest continuous memory space of computer 10.

Unlike the CPU bus which runs at speeds comparable to CPU 12, PCI bus generally runs at speeds of, e.g., 33 MHz or lower. Another bus interface unit 28 is coupled between two dissimilar peripheral busses (i.e., the PCI bus and the ISA/EISA bus). Similar to unit 14, unit 28 is an ASIC or group of ASICs that provide connectivity between various busses, and may also include system function which can possibly integrate one or more serial ports. Attributed to the PCI bus are input/output ("I/O") devices 30, one of which can be a SCSI controller link between, for example, a secondary disk drive and the PCI bus. I/O devices 30 generally operate at higher speeds than I/O devices 32, examples of which include a floppy disk drive, a keyboard, etc.

Figure 2:
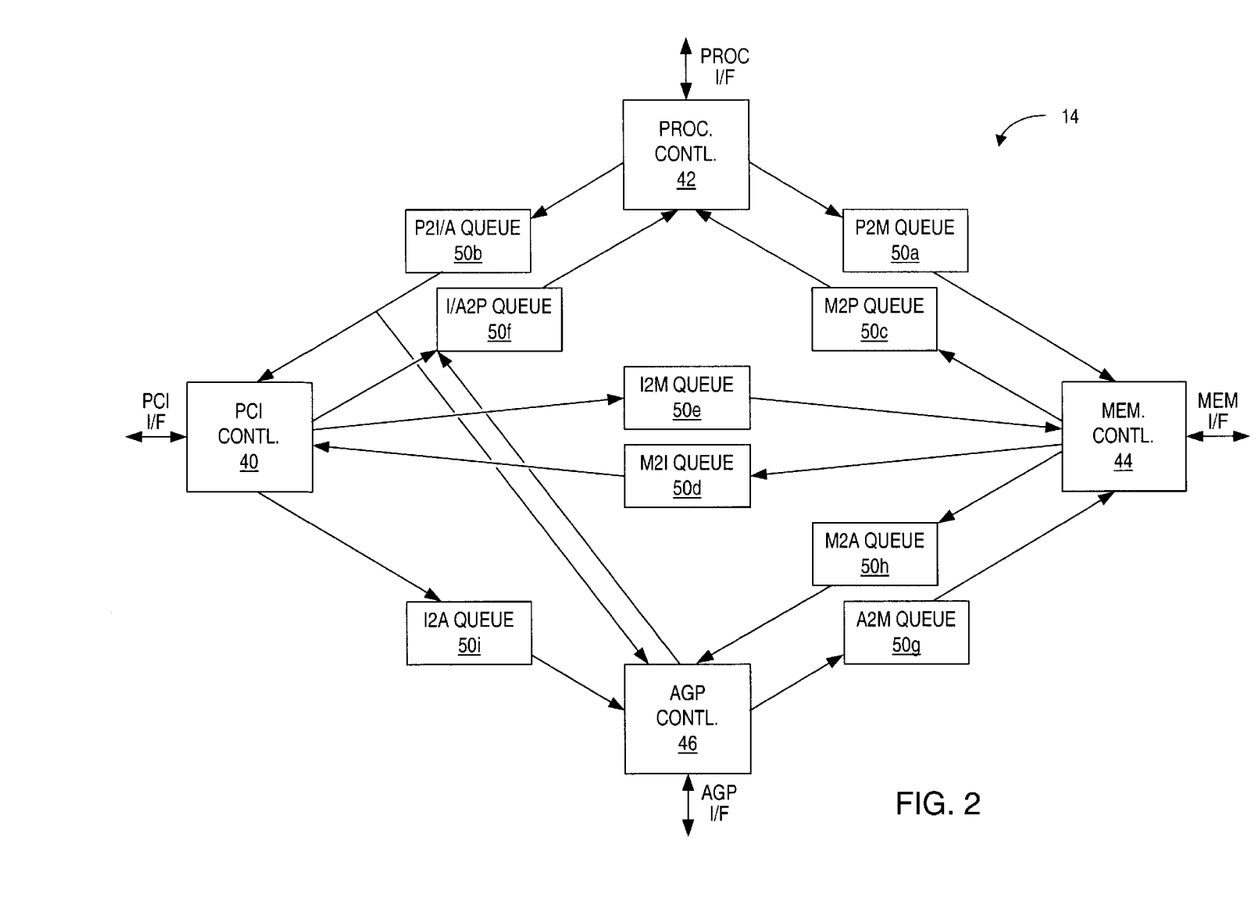
FIG. 2 is a block diagram of a bus interface unit containing address and data queues coupled between a processor, a PCI bus, a graphics bus and a system memory.

Turning to FIG. 2, details regarding bus interface unit 14 are shown. The various sub-components of interface unit 14 can be connected on a monolithic substrate for high end computer applications. Interface unit 14 operates in conjunction with other bus interface units such as interface unit 28, and preferably includes at least four interfaces and multiple address and data queues. Each interface is unique to the specific bus protocol of the bus to which is connected. As shown, the PCI interface ("PCI IF") includes a PCI controller 40 which enables transfer of information (control, address and data) to and from the PCI bus.

Figure 6:
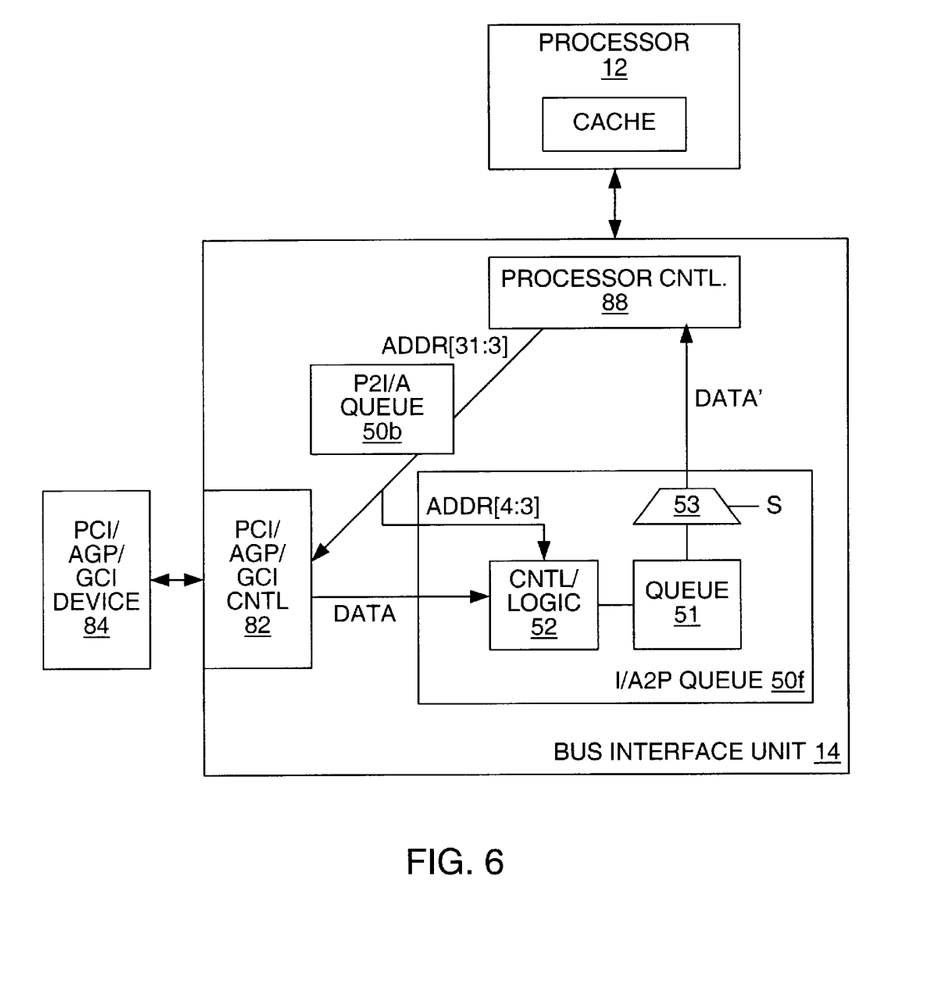
FIG. 6 is a block diagram of the bus interface unit comprising a peripheral controller which modifies addresses sent from the processor, as well as control logic and a data queue which dispatches data in the same order as addresses sent from the processor prior to their modification.

Attributed to each of the other busses is a respective controller which provides an interface for information sent across the respective bus. Thus, in addition to the PCI controller 40, a processor controller 42, a memory controller 44 and an AGP controller 46 are embodied within interface controller 14, as shown in FIG. 6. In addition to the various controllers, there are multiple address and data queues. Each controller operates independent of the others, and cycles are passed between controllers using queues which link respective controllers. FIG. 2 illustrates nine queues: processor-to-memory queue (P2M queue) 50a, processor-to-PCI/AGP queue (P2I/A queue) 50b, memory-to-processor queue (M2P queue) 50c, memory-to-PCI queue (M2I queue) 50d, PCI-to-memory queue (I2M queue) 50e, PCI/AGP-to-processor queue (I/A2P queue) 50f, AGP-to-memory queue (A2M queue) 50g, memory-to-AGP queue (M2A queue) 50h, and PCI-to-AGP queue (I2A queue) 50i. It is recognized, that if needed, an additional graphics interface (i.e., GCI) beyond AGP can be used for graphics intensive applications. Each of the queues 50 shown in FIG. 2 communicate with each other through the various controllers and/or control signals routed directly between respective queues. Separating the major blocks as shown allows for a significant amount of concurrency.

Processor controller 42 controls the CPU interface and the various queues 50 linked to the CPU interface. Processor controller 42 allows the CPU (or processor) to pipeline cycles and allows several cycles to be stored within the processor controller. Additionally, processor controller 42 schedules accesses to cache storage locations within one or more processors.

Memory controller 44 controls possibly multiple banks of SDRAMs, as well as the CS, DQM, RAS, CAS, WE, CKE and address signals sent to those banks. In addition, memory controller 44 generates several control signals to respective queues 50 for memory data bus control. Memory controller 44 arbitrates among processor writes, processor reads, peripheral (i.e., PCI, AGP and GCI) writes, peripheral reads and refresh. Arbitration for each cycle is pipelined into the current memory cycle which ensures that the next memory address is available on the memory bus before the current cycle is complete. This results in minimum delay, if any, between memory cycles. Memory controller 44 is capable of reading ahead on PCI master reads and will do so if the PCI master issues a read multiple command. Interface unit 14 can then continue providing data to the PCI master at a high rate.

PCI controller 40 ensures compatible interface to the PCI bus protocol. When the processor accesses the PCI bus, PCI controller 40 operates as a PCI master. When a PCI master, (e.g., PCI I/O device) accesses memory, PCI controller 40 acts as a PCI slave. Processor-to-PCI cycles are buffered in queue 50b and then presented to controller 40. Controller 40 must determine when this queue needs to be emptied before running in a slave mode.

Processor controller 42 can also be thought of as any device responsible for decoding processor cycles, running snoops to the processor cache storage locations, and providing miscellaneous logic such as soft reset. Functionality of a processor controller used in the bus interface unit is generally well known as any unit which accepts cycles from the CPU bus and then parses them out to the appropriate controllers 40, 44, 46 and/or queues 50. It is recognized that the processor controller consists of a number of sub-modules that can be grouped into various logic subsystems such as a processor bus tracker/queue cycle manager, a processor bus master state machine, snoop control, etc. Similar to processor controller 42, the PCI controller 40 or the AGP controller 46 is also well known as containing a series of state machines which control the PCI/AGP interface. Data passing through the PCI controller 40 is preferably broken into three basic sub-modules: PCI master interface, PCI target (slave) interface and PCI glue logic. PCI controller 40 communicates with memory controller 44, processor controller 42 and queues 50 through various control signals internal to interface unit 14. AGP controller 46 interfaces externally to a 66 MHz, 32 bit AGP/PCI bus and interfaces internally to controllers and queues. Memory controller 44 supports AGP master reads and writes to the system memory using AGP or PCI protocol. Processor controller 42 initiates PCI protocol reads and writes to the AGP master frame buffer and registers. The various queues 50 provide data flow buffers between interfaces.

The various queues 50 can be classified as address and data queues or merely data queues depending on the flow direction of information and the controllers being linked by the respective queues. The following Table I represents a list of the various data and address queues 50, their size, and the data/address flow of each queue:

TABLE I

| Queue Name | Data/Address | No. Locations | Source | Destination |
|---|---|---|---|---|
| P2M(A) | Address | 4 slots | processor | Memory |
| P2M(D) | Data | 4 cache lines | processor | Memory |
| P2I(A) | Address | 8 slots | processor | PCI or GCI |
| P2I(D) | Data | 8 quad words | processor | PCI or GCI |
| M2P | Data | 2 cache lines | memory | Processor |
| I2P | Data | 2 cache lines | PCI or GCI | Processor |
| I2M(A) | Address | 4 slots | PCI | Memory |
| I2M(D) | data | 4 cache lines | PCI | Memory |
| M2I | Data | 2 cache lines | memory | PCI |
| M2A | Data | 8 cache lines | memory | AGP |
| A2M(D) | Data | 8 cache lines | GCI or AGP | Memory |
| A2M(A) | Address | 8 slots | GCI or AGP | Memory |

It is recognized that numerous other queues can be employed. For example, Table I could include queues to another graphics-dedicated transfers associated with PCI, such as GCI. It is also recognized that for a PCI or AGP peripheral device to write to memory, the respective I2M queue and A2M queue transfer both address and data information before presenting that information to the memory controller 44. Information sent from PCI controller 40 (or AGP controller 46) to processor controller 42 is buffered merely as data within the I/A2P queue 50f, and information sent from the processor controller 42 to memory controller 44 is buffered as address and data within the P2M queue 50a.

AGP controller 46 and PCI controller 40 may be deemed as henceforth generically noted as a common controller (hereinafter a "peripheral controller") linked between the processor and one or more peripheral devices connected to a peripheral bus (i.e., the AGP or PCI bus). The peripheral controller contains logic used to modify specific addresses sent from the processor to a peripheral device. The logic is any form of combinatorial logic which changes the fourth and fifth bits within an address to 00 values as described in reference to FIG. 3.

Figure 3:
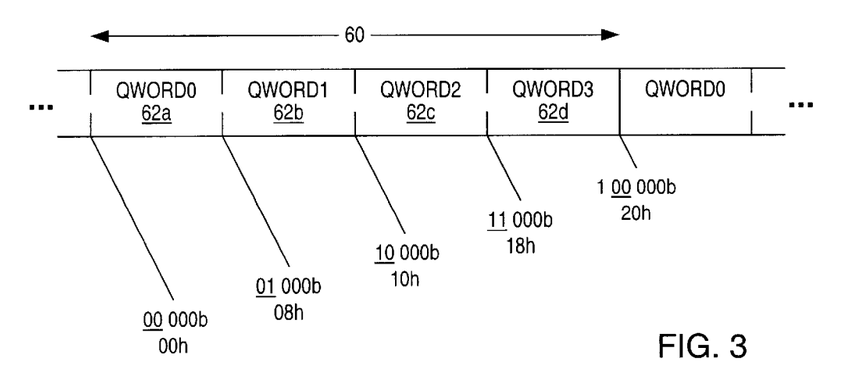
FIG. 3 is a diagram of a cache line and addresses (binary and hexadecimal) used to fetch data from quad word partitions within the cache line, according to one embodiment.

FIG. 3 illustrates a cache line 60 within a sequence of cache lines which can be stored within a peripheral device. Suitable peripheral devices include a graphics accelerator or frame buffer, a hard disk controller, a floppy disk, a keyboard, etc. Cache line 60 may contain several words or quad words ("qword0", "qword1", "qword2" and "qword3" labeled with numeral 62). In the example illustrated, four quad words 62 comprise cache line 60, wherein each quad word contains four words, or 8 bytes. Accordingly, a 64-bit peripheral bus can accommodate transfer of one quad word during a single cycle. Quad words 62 are addressed by a 32-bit address line. The least significant five bits are used to address the 32 bytes within cache line 60. Shown in FIG. 3 are the least significant five bits in both binary and hexadecimal form. The least significant three bits are used to address bytes within a specific quad word; however, the least significant fourth and fifth bits (i.e., bit3 and bit4 shown with an underline) discern which quad word is to be addressed within cache line 60. For example, the least significant five bits ranging between 00000 and 00111 addresses bytes within quad word 62a. Binary bits 01000 through 01111 addresses bytes within quad word 62b, and so forth for the entire cache line 60.

Figure 4:
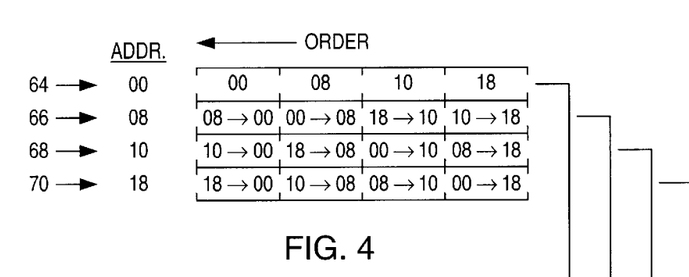
FIG. 4 is a diagram of the order in which addresses sent in toggle mode order from a processor to a peripheral device are reordered to incrementing address order.

A read operation involves transfer of one or more dwords across the peripheral bus (typically a 32-bit bus) to the read requester (or processor). To complete transfer of an entire cache line, the dwords are accumulated as quad words by the bus interface unit, which then transfers quad words across the processor bus. Transfers of four quad words involves addressing the quad words and sending them in a specific order. The peripheral device drives an address onto the bus only once at the start of a cycle. FIG. 4 illustrates a toggle mode addressing scheme used by a processor to select data arranged on, for example, a device linked to a peripheral bus. As shown in line 64, a 00 target address sent from a peripheral device will draw dwords into quad words beginning with address 00, then address 08, then address 10, and finally address 18. This is represented by a sequential addressing or wrap mode addressing scheme. However, as shown in line 66, if the target address requested by the processor is 08, then the second quad word will normally be read before the first quad word, and the fourth quad word will be drawn before the third quad word, wherein the ordered read sequence will be 08 first, followed by 00, followed by 18, and then 10. However, line 66 illustrates modification of the target address 08 to an initial address 00. The second address following the target address is modified from 00 to 08, and so forth. To present a sequential (numerically increasing) address order of 00, 08, 10, and then 18, lines 68 and 70 also show modification to the first target address of 10 and 18, respectively. Modification occurs for each quad word address following the target address to ensure the modified addresses for all the quad words occur in sequential or numerically increasing order. Logic may be called upon to perform the address modification. For example, a logic gate may be used to modify the fourth and fifth bits of the target address to always be 00, and subsequent addresses are modified by incrementing either the fourth bit, the fifth bit, or both the fourth and fifth bits using a combination two-bit counter with appropriate logic.

Modification to the address from toggle mode to sequential mode is therefore shown in Table I relative to a target address:

TABLE I

| Target Address | Modification to Initial Address |
|---|---|
| 00 (hex) | 00 (hex) |
| 08 (hex) | 00 (hex) |
| 10 (hex) | 00 (hex) |
| 18 (hex) | 00 (hex) |

Figure 5:
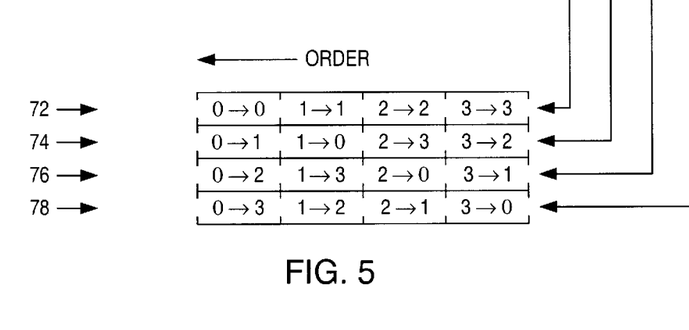
FIG. 5 is a diagram of the order in which data sent in incrementing address order from a peripheral device to a processor are reordered to toggle mode order.

FIG. 5 illustrates data before and after it is re-ordered and then sent to the processor. A combination of FIGS. 4 and 5 defines the addressed data being drawn in sequential address order (i.e., quad word 0, then quad word 1, then quad word 2, and then quad word 3) according to the address scheme shown in reference numeral 64–70. Qword 0 ("0"), followed by qword 1 ("1"), then qword 2 ("2"), and then qword ("3") is sent to the processor as shown in reference numeral 72. However, if the address requested by the processor suggests the target word is not the first (lowest addressable word) within the cache line, as shown by reference numerals 66, 68 and 70, then it is important that the target word be first sent back to the processor not in sequential or numerically increasing order, but rather in toggle mode as shown by reference numeral 74, 76 and 78. Instead, reference numerals 66 and 74 indicate that if the target address is 08 (used to select qword "1") then the address will be changed in numerically increasing order as shown by reference numeral 66. However, the numerically increasing qwords will be modified as shown by reference numeral 74. Instead of sending qword 0 ("0") first, qword 1 ("1") will be sent first followed by qwords 0, 3, 2, as shown by reference numeral 74. Reordering the qwords indicated by numerals 74, 76 and 78 is necessary to preserve the order at which the processor dispatches addresses.

Modification to the address from sequential mode to toggle mode is therefore shown in Table II relative to a target address:

TABLE II

| Target Address | Where Data Placed in Queue for Sequential Removal | | | |
|---|---|---|---|---|
| 00 (hex) | 00 | 08 | 10 | 18 (hex) |
| 08 (hex) | 08 | 00 | 18 | 10 (hex) |
| 10 (hex) | 10 | 18 | 00 | 08 (hex) |
| 18 (hex) | 18 | 10 | 18 | 00 (hex) |

FIG. 6 illustrates specific components used to carry out a read operation. Bus interface unit 14 includes a peripheral controller (or interface controller) 82. Interface controller 82 is coupled between a peripheral bus and various queues within bus interface unit 14. The peripheral bus can be any bus other than the local CPU bus, and preferably includes a bus which is configured to burst data in successive address order. Various input devices coupled to the peripheral bus include, for example, a PCI input device and/or a graphics input device. The peripheral device may be considered a slave unit and responds to a read request (or address) within the address range of that device. Controller 82 obtains mastership of the peripheral bus before sending an address to peripheral device 84.

A processor controller 88 is coupled between the CPU local bus (on which processor 12 is connected) and various queues within bus interface unit 14. Those queues include a processor-to-interface ("P2I/A") queue 50b, and an interface-to-processor ("I/A2P") queue 50f. Queue 50b contains addresses sent from processor controller 88, and queue 50f contains data returned from interface controller 82.

Interface controller 82 includes logic used to modify the fourth and fifth least significant bits of addresses sent from processor 12. Once the first address is modified to an initial address of 00 hex, the PCI bus automatically bursts data at successive addresses until a cache line boundary is reached or burst occurs to the requested length. This implies that subsequent quad words within a cache line need not be addressed. Once logic within controller 82 modifies the fourth and fifth least significant bits, queue 50f receives data in successive, numerically increasing order. Control logic 52 within I/A2P queue 50f loads the unmodified fourth and fifth least significant bits of the address (i.e., "ADDR [4:3]") within an input pointer counter. The pointer counter keeps track of and aligns the addresses with data returned from controller 82.

Modifying the target address to an initial address of a successive order of addresses used for a particular cache line requires that the amount of modification be kept track of. Specifically, control logic 52 receives the address of data prior to that address being modified within controller 82. Control logic 52 thereby notes a difference between the data addressed by processor controller 88 and data returned by the peripheral controller 82. That difference allows control logic 52 to re-order the successively addressed quad words returned from controller 82 into toggle mode addressed quad words acceptable to controller 88.

The examples set forth above are primarily attributed to re-ordering a burst of four quad words within a cache line. However, it is understood that re-ordering bursts of two quad words (instead of four) can be achieved by the present invention. If the target address is 08 hex, then logic within controller 82 will modify the address to 00 hex and burst the quad word at 00 hex successively followed the quad word at address 08 hex. Control logic 52 will receive quad words at 00 hex followed by 08 hex. However, the quad words will be re-ordered and sent to the processor controller beginning with the quad word at 08 hex and ending with the quad word at 00 hex. The same scenario applies if the target address is 18 hex, followed by 10 hex. Burst will occur of data at 10 hex immediately followed by data at 18 hex. Re-ordering will occur, however, within the I/A2P queue to place data back in the order requested by the processor controller.

FIG. 6 indicates one possible example by which data is re-ordered by I/A2P queue 50f. In the example shown, control logic 52 receives data in successive order. However, ADDR[4:3] selects that data in the order of bits 4:3. That order is maintained within data queue 51. As data queue 51 is filled, the quad words are dispatched into multiplexer 53 in the same order of bits 4:3. Multiplexer 53 then sends the quad words onto processor controller 88 in the same order in which data is addressed by the processor. Alternatively, steering logic can be situated between control logic 52 and queue 51 to place data in toggle mode order within data queue 51. If the target address is 10 hex, the third quad word corresponding to address 10 is placed in location 0 of queue 51. The initial address quad word arriving from controller 82 in the immediately preceding example, is placed in location 2 of queue 51. For example, the select "s" pin of multiplexer 53 always chooses data in the same order. The select pin of multiplexer 53 draws quad words beginning at location 0, followed by location 1, then location 2 and finally location 3.

It will be appreciated to those skilled in the art having the benefit of this disclosure that this invention is believed to be capable of performing high speed read operations to a processor from a peripheral device linked to a PCI bus or a graphics bus. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computer, comprising:
    a peripheral bus on which a peripheral device is coupled for storing a plurality of quad words arranged within a cache line;
    a local bus on which a processor is coupled; and
    a bus interface unit coupled between the peripheral bus and the local bus for aligning a plurality of addresses corresponding to the plurality of quad words in incrementing address order from the processor to the peripheral device, and thereafter re-aligning the plurality of quad words in toggle mode order from the peripheral device to the processor.

2. The computer as recited in claim 1, wherein said peripheral device is embodied upon a monolithic substrate separate from the bus interface unit.

3. The computer as recited in claim 1, wherein said peripheral bus is a peripheral component interface (PCI) bus.

4. The computer as recited in claim 1, wherein said peripheral bus is a bus linked to the bus interface unit by an advanced graphics port (AGP).

5. The computer as recited in claim 1, wherein said bus interface unit comprises a processor controller which includes logic coupled to modify the plurality of addresses sent in non-incrementing address order from the processor, beginning with a target address.

6. A computer, comprising:

a local bus upon which a processor is coupled;

a peripheral device adapted to store a plurality of quad words arranged within a cache line;

a bus interface unit coupled between the peripheral device and the local bus, wherein the bus interface unit includes:

a processor controller connected to the local bus for receiving a target address corresponding to one of the plurality of quad words, and wherein the processor controller includes logic for modifying the target address to an initial address having the smallest numerical address within a sequential order of addresses used to select the plurality of quad words;

a data queue coupled to receive the plurality of quad words selected by the sequential order of addresses; and selection logic coupled to de-queue the data queue of quad words into the processor beginning with a target quad word corresponding to the target address.

7. The computer as recited in claim 6, wherein the peripheral bus is a peripheral component interface (PCI) bus.

8. The computer as recited in claim 6, wherein said output device comprises an electronic display linked to the bus interface unit by a graphics bus.

9. The computer as recited in claim 8, wherein said graphics bus comprises an advanced graphics port (AGP).

10. The computer as recited in claim 6, wherein the sequential order of addresses consists of a numerically increasing address order.

11. The computer as recited in claim 6, wherein said selection logic comprises an address pointer for aligning the quad words with an address sent by the processor to the peripheral device.

12. The computer as recited in claim 6, wherein said data queue is operably coupled to the peripheral device for receiving the target quad word after receiving an initial quad word corresponding to the initial address.

13. The computer as recited in claim 6, wherein said selection logic comprises a multiplexer for ordering the target quad word into the data queue or into the processor controller prior to the initial quad word.

14. A method for reading a plurality of quad words stored within a device linked to a peripheral bus, comprising:

presenting a target address from a processor linked to a local bus;

reordering the target address to an initial address within a sequence of numerically increasing addresses used to successively access the plurality of quad words within a single cache line;

presenting the plurality of quad words to a data queue beginning with an initial quad word addressed by the initial address;

de-queuing from the data queue to the processor a target quad word addressed by the target address; and thereafter de-queuing the initial quad word from the data queue to the processor.

15. The method as recited in claim 14, further comprising de-queuing a plurality of cache lines subsequent to the single cache line according to an increasing sequential order of addresses used to select quad words within each of the subsequent cache lines.

16. The method as recited in claim 14, wherein the de-queuing subsequent cache lines occurs throughout the entire subsequent cache line in an increasing sequential order of addresses.

17. The method as recited in claim 14, wherein the target address is an address which occurs after the initial address within the numerically increasing addresses.

18. The method as recited in claim 14, wherein the reordering comprises changing a pair of bits within the target address which designate differences in quad words being addressed.

* * * * *